United States Patent [19]
Bellera et al.

[11] Patent Number: 6,070,829
[45] Date of Patent: Jun. 6, 2000

[54] FLIGHT CONTROL SYSTEM FOR ROTARY-WING AIRCRAFT, ESPECIALLY FOR A HELICOPTER

[75] Inventors: Jacques Serge Louis Bellera; Serge Joseph Mezan, both of Aix-En-Provence, France

[73] Assignee: Eurocopter, Marignane Cedex, France

[21] Appl. No.: 08/976,502

[22] Filed: Nov. 24, 1997

[30] Foreign Application Priority Data

Nov. 22, 1996 [FR] France .................................. 96 14288

[51] Int. Cl.[7] .............................. B64C 11/34; G05D 1/00
[52] U.S. Cl. ........................................ 244/17.13; 244/194
[58] Field of Search ............................... 244/17.13, 194, 244/195, 196, 197

[56] References Cited

U.S. PATENT DOCUMENTS

| | | | |
|---|---|---|---|
| 3,626,163 | 12/1971 | Dommasch | 244/197 |
| 4,109,886 | 8/1978 | Tribken et al. | 244/196 |
| 4,387,430 | 6/1983 | Verzella et al. | 244/17.13 |
| 4,527,242 | 7/1985 | McElreath et al. | 244/17.13 |
| 4,642,774 | 2/1987 | Centala et al. | . |
| 5,224,664 | 7/1993 | Adams, Sr. et al. | 244/17.13 |
| 5,255,880 | 10/1993 | Lyloc et al. | . |
| 5,641,136 | 6/1997 | Skow et al. | 244/195 |

FOREIGN PATENT DOCUMENTS 2011875  3/1970  France .

*Primary Examiner*—Peter M. Poon
*Assistant Examiner*—Charles Ducker
*Attorney, Agent, or Firm*—Stevens, Davis, Miller & Mosher, L.L.P.

[57] ABSTRACT

A flight control limiting system for a rotary-wing aircraft which generates servo-commands for at least one of a main rotor and a tail rotor. A set of first commands represents the position of at least one flight control which is movable between extreme positions, and may be controlled by the pilot. A set of second commands are generated by a flying aid system. The flight control limiting system limits the values of the set of second commands when the position of any of the flight controls is close to an extreme position, so that the servo-commands for that particular flight control corresponds to the set of first commands.

11 Claims, 4 Drawing Sheets

FLIGHT CONTROL SYSTEM FOR ROTARY-WING AIRCRAFT, ESPECIALLY FOR A HELICOPTER

The present invention relates to a flight control system for a rotary-wing aircraft, especially for a helicopter.

It is known that in a helicopter which does not have any flying aid system, such as an electric flying aid device (CDVE) or optical flying aid device (CDVO) or an automatic pilot, for example, there is a correspondence between, on the one hand the position of the flight controls, for example the collective pitch lever, the cyclic pitch stick or the rudder bar that can be operated by a pilot of the aircraft and, on the other hand, the axis command applied to the rotor(s) of the helicopter in response to operation of at least one of said flight controls. This correspondence allows the pilot to estimate in particular the amount of control remaining on each axis. This estimate is generally used by the pilot to evaluate his maneuver margin.

By contrast, when the helicopter does have a flying aid device of the aforementioned type, which acts on the stability of the helicopter, uncouplings or the adherence to flight parameters, such as trim or heading, aforementioned correspondence is no longer achieved, as discussed below.

Thus, for example, in the case of a helicopter which has an automatic pilot, there is generally a jack mounted in the lift control linkage and which receives commands from said automatic pilot which are added to the commands that represent the position of the flight controls. This means that the position of said flight controls no longer directly corresponds to the axis command applied to the rotor(s). The latter command is then actually the result of the sum of the orders that represent the position of the flight controls and the orders generated by said automatic pilot.

A similar situation is encountered in aircraft that have an electric flying aid device (CDVE). In this case, a computer replaces the aforementioned linkage and jack and formulates an overall axis-control command, that includes the commands from the pilots and the commands from the flying aid.

Current developments in flight control systems tend to exacerbate the aforementioned problem because, particularly for reasons of safety and quality of flight, flying aid systems like those mentioned above are now arousing greater interest and exerting a greater influence which then needs increasing control. The issue is now that of being able to manage controls more powerful than those currently used on conventional aircraft.

Thus, in order to make the pilot of the aircraft aware of the control margin remaining on each of the flight controls, two different solutions have been proposed:
  a) displaying, on a display system, characteristic signs that directly indicate the remaining control margin. However, this solution is hardly satisfactory especially as regards safety, because in situations when the pilot needs to be precisely aware of the remaining control margins, his attention is generally fully focused on flying, and in order to see the display, he then needs to look inside the cockpit and take his attention away from flying. What is more, this solution requires an appropriate display system;
  b) providing the information directly through the controls, by generating tactile sensations, such as making more effort required or producing vibration. In this case, the information provided is hardly accurate and may also interfere with flying.

Thus, neither of the aforementioned two known solutions is satisfactory.

The object of the present invention is to overcome these drawbacks. This invention relates to a flight control system for a rotary-wing aircraft, especially for a helicopter, equipped with a flying aid system, said flight control system making it possible, in a simple and accurate way, to make the pilot aware of the control margins remaining on the various flight controls, while at the same time taking the assistance provided by said flying aid system into account.

To achieve this, according to the invention, said flight control system for a rotary-wing aircraft, generating commands for at least one rotor of said aircraft, said commands being calculated on the basis of:
  first commands that represent the position of at least one flight control that can be moved by a pilot of said aircraft between extreme positions; and
  second commands generated by a flying aid system, is noteworthy in that it comprises a limiting system associated with said flying aid system and intended to limit the values of at least some of said second commands, depending on the position of said flight control, so that, especially when said flight control is brought close to one of said extreme positions, said commands essentially correspond to said first commands.

Thus, by virtue of the invention, the action of the flying aid system is adapted to the position of said flight control, so that:
  the pilot can be aware of the control margin remaining for the positions of the flight control for which this information is important, namely essentially positions close to said extreme positions; and
  the flying aid (that is to say said second commands) is taken into account as much as possible, that is to say especially when there is enough margin for control remaining for the pilot not to have to be informed accurately of the amount of margin left.

Furthermore, the solution recommended by the present invention allows the pilot to be informed without distracting him from his flying, and it does not require any special display system, which makes it possible for this solution to be applied to any kind of rotary-wing aircraft.

As a preference, said second commands are limited by continuous limiting functions generating a minimum limit when said flight control is brought close to its central position and a maximum limit when said flight control is brought close to one of its extreme positions.

In order to optimize the effectiveness of the present invention, advantageously at least some of said limiting functions have variable values that depend on the value of parameters, such as the angular speed of the aircraft, for example, that can be measured on the aircraft.

Furthermore, when said flying aid system comprises a number of calculation means, each of which is intended to calculate at least one of said second commands, said limiting system advantageously comprises a number of limiting means, at least one of which is associated respectively with each of said calculation means.

What is more:
  when the aircraft is equipped with an automatic pilot, said flying aid system preferably corresponds to said aircraft automatic pilot; and
  where the aircraft is equipped with an electrical or optical flying aid system, said flying aid system and said limiting system are advantageously incorporated into said flying device.

The figures of the appended drawing will make it easy to understand how the invention can be achieved. In these figures, identical references denote similar elements.

FIG. 1 is the block diagram of a flight control system in accordance with the invention, mounted on a helicopter equipped with an electrical flying aid device.

FIG. 2 diagrammatically illustrates a part that relates to just one axis of control of a flight control system according to the invention, mounted on a helicopter equipped with a flying-aid system.

Figure 1:
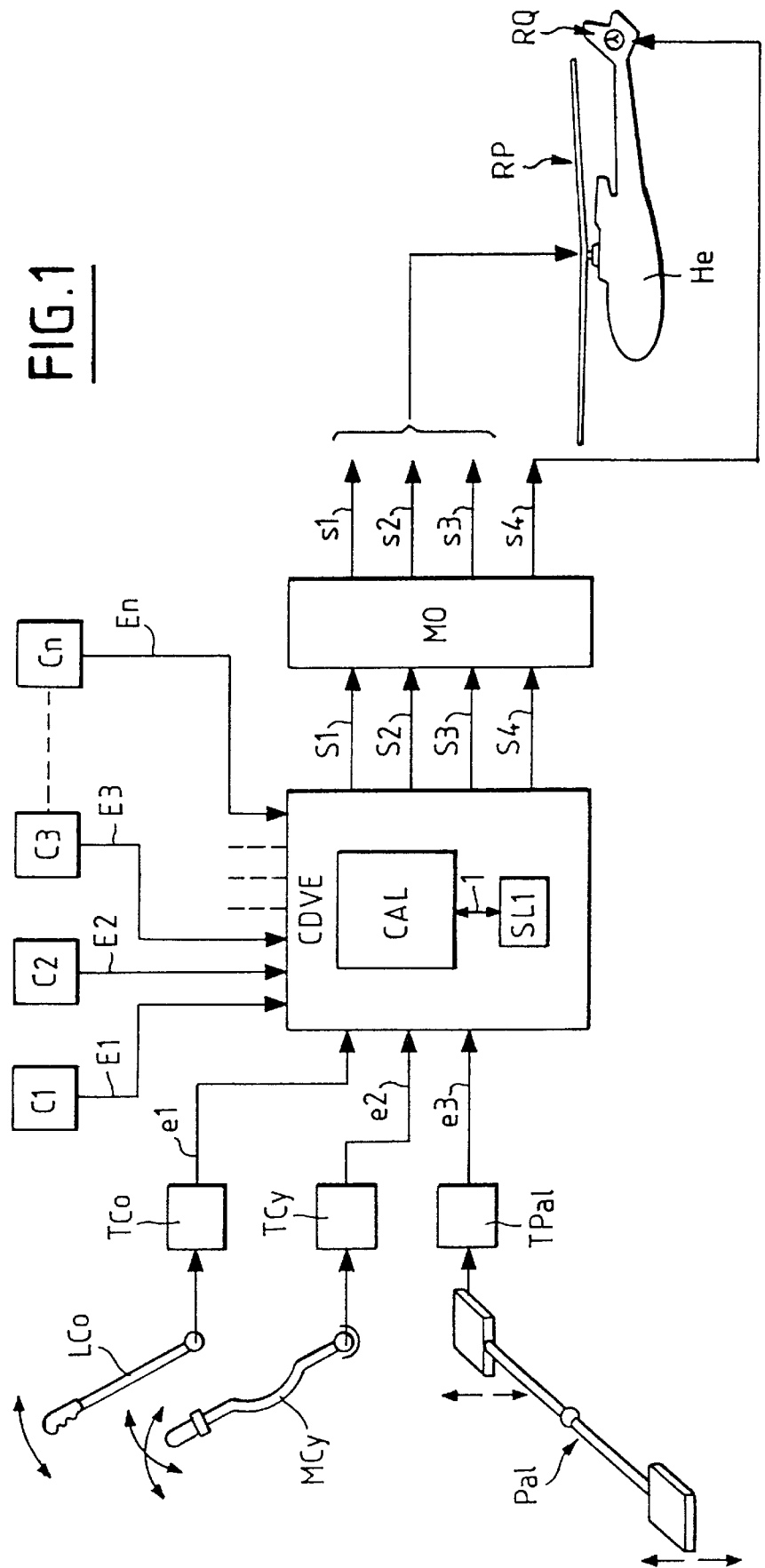
Figure 2:
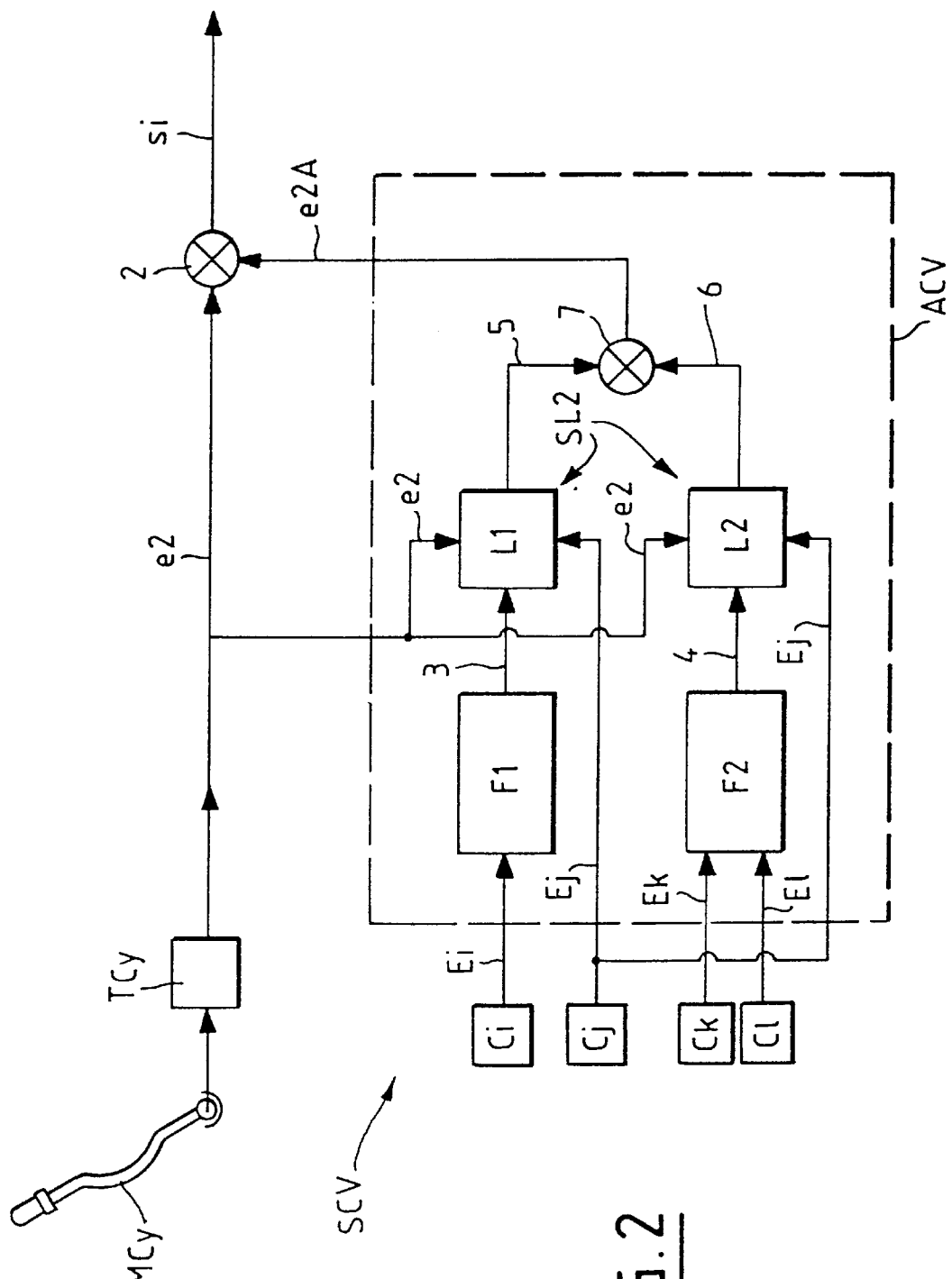
Figure 3:
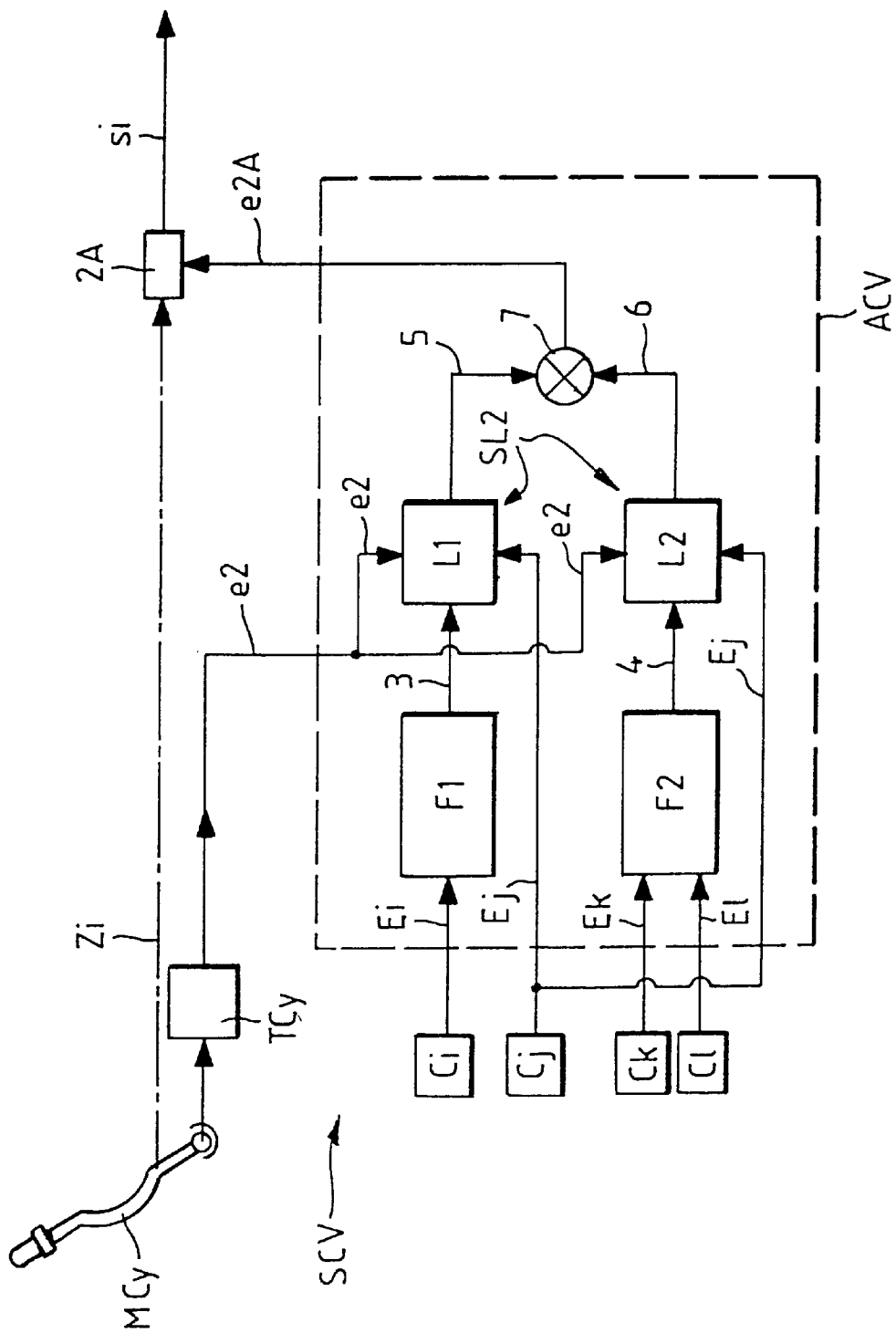
FIG. 3 is a figure similar to FIG. 2, but in the case of a helicopter fitted with an automatic pilot of the conventional type.

The flight control system for a rotary-wing aircraft in accordance with the invention is illustrated for different embodiments CDVE and SCV depicted in FIGS. 1 to 3.

Said flight control systems CDVE and SCV are of course mounted on board said rotary-wing aircraft, in this case a helicopter He to be flown, even though, for reasons of clarity of the drawing, the helicopter He has been depicted on a smaller scale outside the flight control system CDVE in FIG. 1. In the example depicted, the helicopter He has a main rotor RP intended to provide lift and forward travel, and a tail rotor RQ intended to provide equilibrium and yaw control of the helicopter He.

The embodiment of the flight control system for a helicopter, depicted schematically in FIG. 1, comprises an electric flying aid device CDVE that receives a number of items of information and emits commands. For this purpose, in the example depicted, the following are associated in the known way with said device CDVE:

a collective pitch lever LCo, associated with a transducer TCo converting the movements of said lever into an electrical signal sent to the device CDVE by a link e1;

a cyclic pitch stick MCy, associated with a transducer TCy converting the movements of said stick into an signal sent to the device CDVE by a link e2;

a rudder bar Pal, associated with a position sensor TPal converting the movements of said rudder bar into an electrical signal sent to the device CDVE by a link e3;

a number of n sensors C1 to Cn, mounted on board the helicopter and delivering, in the form of electrical signals, a number of items of information regarding the status of said helicopter, such as airspeed, angular speeds, angular accelerations, trim, loading factors, etc., said information items being sent to the device CDVE by links E1 to En; and an order mixer MO receiving, by links S1 to S4, the commands formulated by the device CDVE on the basis of the signals sent by the links e1 to e3 and E1 to En, as specified above, and sending commands, by links s1 to s3, to the servocontrols for the main rotor RP and, by the link s4, to the servocontrol for the tail rotor RQ. Although it has been depicted independently in FIG. 1, for the purpose of simplifying the drawing, said command mixer MO is generally incorporated into said electric flying aid device CDVE.

As is known, said electric flying aid device CDVE, using an inbuilt algorithm illustrated by a computing means CAL, determines the commands for said rotors RP and RQ, taking account of the following simultaneously:

information items representing the respective positions of the aforementioned flight controls, namely the collective pitch lever LCo, the cyclic pitch stick MCy and the rudder bar Pal, which controls can be operated by a pilot of the helicopter He; and information delivered by the sensors C1 to Cn, relating the status of said helicopter He.

Formed in this way, the device CDVE constitutes a flying aid system because, when calculating the commands, it takes into account not only the flight commands produced by the pilots but also the actual status of the helicopter and thus determines optimized commands which differ from the commands given by the pilots via the flight controls, the purpose of this being in particular to stabilize the helicopter He and to optimize adherence to parameters, such as the heading, for example (or, alternatively, trim, speed, etc.).

There is therefore no correspondence between the positions of said flight controls LCo, MCy and Pal and the respective axis commands applied to the rotors RP and RQ.

Thus, to enable the pilot to estimate the margin of control remaining on each flight control, the device CDVE comprises, according to the invention, a limiting system SL1 incorporated into and associated with said calculation means CAL, as illustrated by a link 1.

Said limiting system SL1 is intended to limit the importance of the information calculated on the basis of the sensors C1 to Cn and which relate to the helicopter status in the commands applied to the rotors RP and RQ as a function of the position of the flight controls LCo, MCy and/or Pal.

More specifically:

in the areas of control or movement of said flight controls for which knowledge of the axis-control margins that remain is important, or even essential for flying (that is to say essentially at the extreme positions of said flight controls), the commands relating to information concerning the helicopter status are limited as much as possible so as to obtain correspondence between the positions of said flight controls and the respective axis commands applied to the rotors, whereas in the other control areas, and especially in the control areas where assistance with flying is needed (particularly for the central positions of the flight controls), there is minimum limitation, that is to say that the aforementioned flying aid is taken into account as much as possible.

Thus, by virtue of the invention, each time it is needed, precise information regarding the remaining control margins is given in an effective manner, while at the same time the assistance with flying provided by said flying aid system is taken into account as much as possible.

In the embodiment depicted in FIG. 2, the invention is applied to a helicopter which does not have a flying aid device, such as the device CDVE in FIG. 1, and the flight control system SCV of which is of the simplified type, as discussed below.

Said flight control system SCV (depicted diagrammatically and partially in FIG. 2) determines, in the known way, the commands for each of the axes of control of the rotors RP and RQ of the helicopter, namely respectively for controlling the collective pitch, roll, yaw and pitching, on the basis of:

first commands representing the position of said flight controls. For this purpose, FIG. 2 depicts only that part of the flight control system SCV that applies to controlling the roll, and therefore only the cyclic pitch stick MCy that can be moved sideways to control the roll. Of course the features of the invention which are specified below for controlling roll are also valid for controlling collective pitch, yaw and pitching; and second commands generated by a flying aid system ACV, for example an automatic pilot, intended in particular to stabilize the helicopter.

Said first and second commands are transmitted respectively via links e2 and e2A to a summer 2 which sums said commands and sends the result by a link si to the servocontrols of the main rotor RP controlling the roll of the helicopter He.

In the known way, the system ACV contains inbuilt algorithms depicted in the form of calculation means F1 and F2, which determine said second commands for assisting with flying as a function of measurements made by sensors Ci, Ck and Cl and transmitted by links Ei, Ek and El respectively.

For this purpose, by way of example:

the sensor Ci may measure the angular rate of rolling;

the sensor Ck may measure the effective roll attitude; and the sensor Cl may measure the reference trim attitude.

According to the invention, in this case, the limiting system SL2 associated with said system ACV contains limiting means L1 and L2 connected respectively, as illustrated by links 3 and 4, to said calculation means F1 and F2 in order to limit the values generated by these calculation means F1 and F2 as a function of the position of the cyclic pitch stick MCy. To do this, said limiting means L1 and L2 receive a signal which represents the position of said stick MCy via the link e2 which is therefore duplicated, as depicted in FIG. 2.

In the embodiment depicted in FIG. 3, the invention is applied to a helicopter which is equipped with an automatic pilot ACV of a conventional type.

In this case, the first commands are not generated electrically as they were in the example in FIG. 2, but are generated mechanically via a linkage Zi depicted in chain line and establishing a link between the cyclic pitch stick MCy and a jack 2A of a known type.

By contrast, the automatic pilot ACV determines the second commands in a way similar to that of the example of FIG. 2 and transmits them to the jack 2A by the link e2A.

Figure 4:
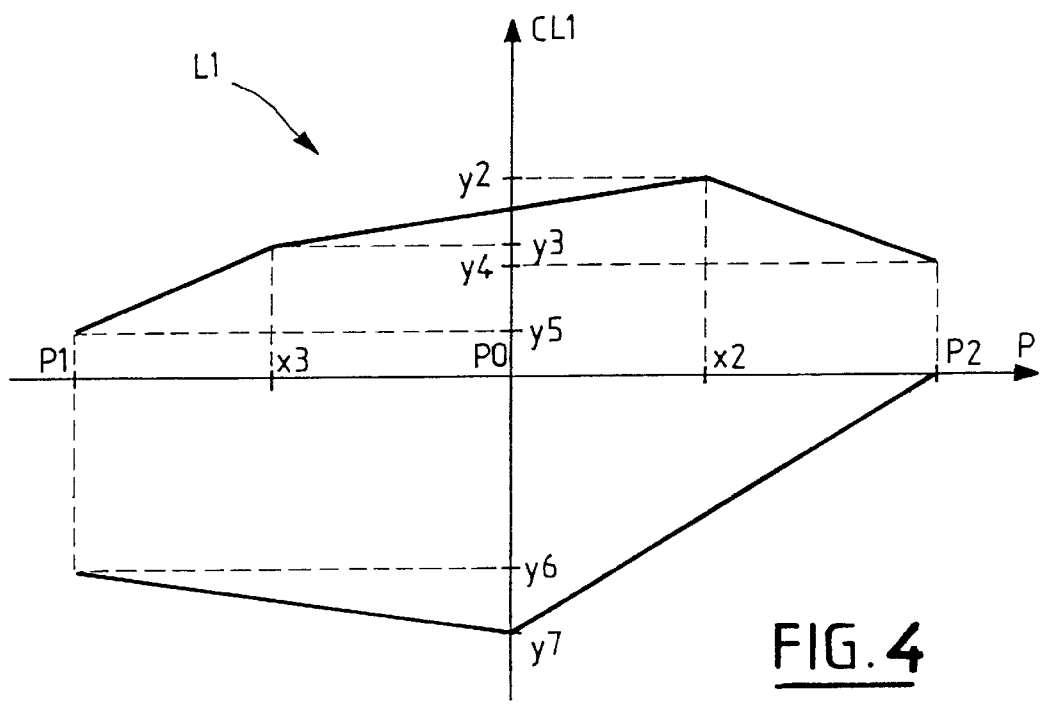
FIG. 4 illustrates the limiting curve of a first limiting means in accordance with the invention.
Figure 5:
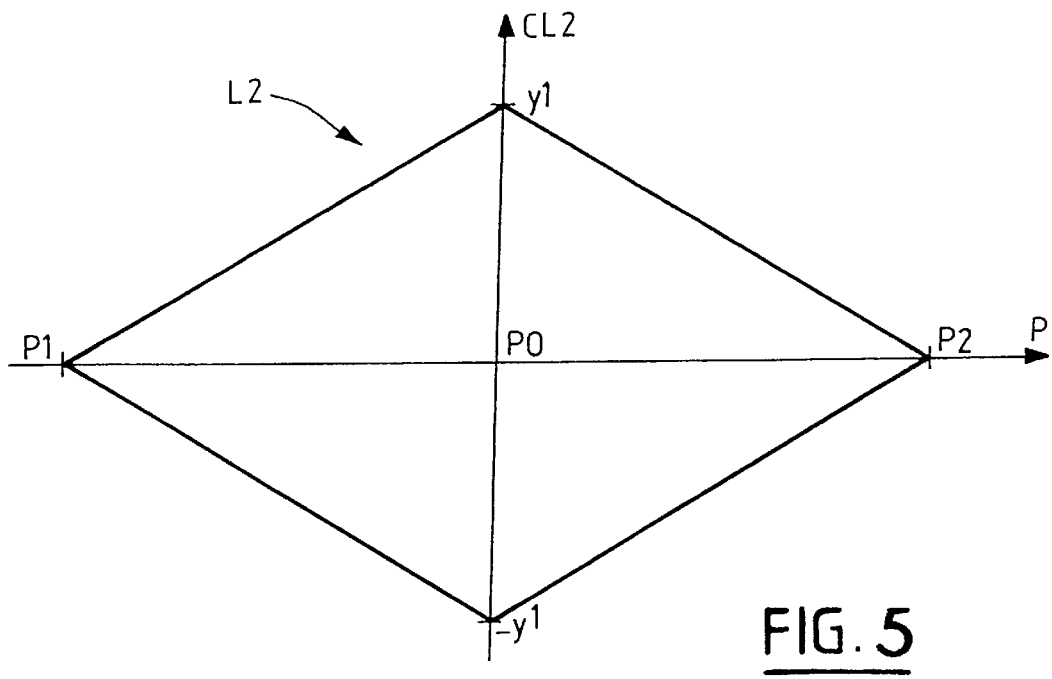
FIG. 5 illustrates the limiting curve of a second limiting means in accordance with the invention.

According to the invention, the limiting means L1 and L2 may for example have limiting curves CL1 and CL2 like those depicted in FIGS. 4 and 5 respectively, as a function of the position P of said cyclic pitch stick MCy.

In these FIGS. 4 and 5, the central position PO and the extreme positions P1 and P2 of said stick MCy are indicated in particular.

In the case of the limiting means L2 illustrated in FIG. 5, it can be seen that the limiting curve CL2 has two axes of symmetry, these being both the abscissa axis and the ordinate axis.

In this case, limitation is:

at a maximum at the extreme positions P1 and P2 of the stick MCy so as to cancel out the commands provided by the calculation means F2 for these extreme positions P1 and P2; and at a minimum for the central position PO, for which a maximum value $\pm y1$ is allowed for the commands provided by said calculation means F2.

In contrast, the limiting curve CL1 (of which values y2 to y7 have been illustrated) of the limiting means L1 is not symmetric, as can be seen in FIG. 4.

In this case, at the extreme positions P1 and P2 of the stick MCy, limitation which is then at a maximum accepts commands with non-zero values y4, y5 or y6.

For positive values, the curve CL1 has three successive segments which meet when the stick is in positions x3 and x2 respectively.

The commands determined by the calculation means F1 and F2 and limited by the limiting means L1 and L2 are sent respectively by links 5 and 6 to a summer 7 which sums them and transmits the result via the link e2A to the summer 2 or to the jack 2A, depending on the embodiment concerned.

The limiting curves CL1 and CL2 could of course have predefined fixed values.

However, in a particularly advantageous embodiment of the invention, said values y1 to y7 are variable and depend on the flight conditions or the status of the helicopter.

Thus more specifically, these values y1 to y7 may depend on the effective value of a characteristic parameter, for example the longitudinal speed of the helicopter He, which can be measured by a sensor Cj, the measured value being transmitted to said limiting means L1 and L2 by a link Ej, as depicted in FIGS. 2 and 3.

We claim:

1. A flight control system for a rotary-wing aircraft, said flight control system generating servo-commands for at least one rotor of said aircraft, said servo-commands being calculated on the basis of:

first commands that represent a position of at least one flight control comprising at least one of a collective pitch lever, a cyclic pitch stick, and a rudder bar that can be moved by a pilot of said aircraft between first and second extreme positions; and second commands generated by a flying aid system, wherein said flight control system comprises a limiting system associated with said flying aid system for limiting the values of at least some of said second commands, depending on the position of said at least one flight control, so that when said at least one flight control is brought close to one of said first and second extreme positions, said servo-commands essentially correspond to said first commands.

2. The flight control system as claimed in claim 1, wherein said second commands are limited by continuous limiting functions generating a minimum limit when said at least one flight control is brought close to a central position thereof and a maximum limit when said at least one flight control is brought close to one of said first and second extreme positions.

3. The flight control system as claimed in claim 1, said second commands being limited by limiting functions, wherein at least some of said limiting functions have variable values that depend on the value of parameters that can be measured on the aircraft.

4. The flight control system as claimed in claim 1, said flying aid system comprising a number of calculation means, each of which is intended to calculate at least one of said second commands, wherein said limiting system comprises a number of limiting means, at least one of which is associated respectively with each of said calculation means.

5. The flight control system for an aircraft equipped with an automatic pilot, as claimed in claim 1, wherein said flying aid system corresponds to said aircraft automatic pilot.

6. The flight control system as claimed in claim 5, wherein said first commands are generated by a transducer associated with said at least one flight control and converting the movement of said at least one flight control into an electrical signal.

7. The flight control system as claimed in claim 5, wherein said first commands are generated via a linkage and a jack which are associated with said cyclic pitch stick.

8. The flight control system for an aircraft equipped with a flying device, as claimed in claim 1, wherein said flying aid system and said limiting system are incorporated into said flying device.

9. The flight control system for an aircraft equipped with a collective pitch lever, as claimed in claim 1, wherein said at least one flight control corresponds to said collective pitch lever of the aircraft.

10. The flight control system for an aircraft equipped with a cyclic pitch stick, as claimed in claim 1, wherein said at least one flight control corresponds to said cyclic pitch stick of the aircraft.

11. The flight control system for an aircraft equipped with rudder bar, as claimed in claim 1, wherein said at least one flight control corresponds to said rudder bar of the aircraft.

* * * * *